United States Patent

Sugiyama et al.

[11] 4,130,430
[45] Dec. 19, 1978

[54] SILVER HALIDE LIGHT-SENSITIVE MATERIAL CONTAINING DYE

[75] Inventors: Masatoshi Sugiyama; Eiichi Kato, both of Minami-ashigara, Japan

[73] Assignee: Fuji Photo Film Co., Ltd., Minami-ashigara, Japan

[21] Appl. No.: 788,948

[22] Filed: Apr. 19, 1977

[30] Foreign Application Priority Data

Apr. 20, 1976 [JP] Japan ................................ 51-44788

[51] Int. Cl.$^2$ .............................................. G03C 1/84
[52] U.S. Cl. ................................... 96/84 A; 96/84 R; 96/74
[58] Field of Search ............... 96/84 R, 84 A, 57, 143

[56] References Cited

U.S. PATENT DOCUMENTS

| | | | |
|---|---|---|---|
| 3,615,546 | 10/1971 | Depoorter et al. | 96/84 R |
| 3,746,547 | 7/1973 | Tsuji et al. | 96/84 A |
| 3,773,509 | 11/1973 | Ohyama et al. | 96/84 A |
| 3,989,528 | 11/1976 | Sugiyama et al. | 96/84 R |

*Primary Examiner*—J. Travis Brown
*Attorney, Agent, or Firm*—Sughrue, Rothwell, Mion, Zinn and Macpeak

[57] ABSTRACT

A silver halide light-sensitive material containing at least one hydrophilic colloid layer which contains a basic polymer and at least one oxonol dye represented by the following general formula (I):

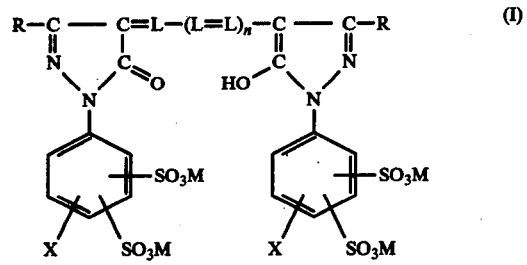

wherein R represents an aliphatic residue having 4 or more carbon atoms, an aralkyl group or a heterocyclic group; X represents a hydrogen atom, a halogen atom, a sulfo group, a lower alkyl group or a hydroxy group; L represents a methine group including a substituted methine group; M represents a cation; and n represents 0, 1 or 2. The dye has no adverse affects on the photographic properties of the silver halide light-sensitive material and can be easily removed from the hydrophilic colloid layer during photographic processing.

14 Claims, No Drawings

SILVER HALIDE LIGHT-SENSITIVE MATERIAL CONTAINING DYE

BACKGROUND OF THE INVENTION

1. Field of the Invention

The present invention relates to a photographic light-sensitive material having a dyed hydrophilic colloid layer. Particularly, the present invention relates to a silver halide photographic light-sensitive material having a hydrophilic colloid layer containing a dye which is easily decolored and removed at photographic processings and a basic polymer.

2. Description of the Prior Art

In the production of photographic light-sensitive materials, layers which are colored often comprise hydrophilic colloids. Therefore, water-soluble dyes are usually incorporated in the layers for coloration. Dyes used for such a purpose should have, of course, appropriate spectral absorption characteristics depending on the purpose of use and should satisfy the following requirements.

(1) The dyes should be photochemically inert. Namely, the dyes should not have an adverse chemical influence upon the properties of the silver halide photographic emulsion layers, such as reduce the sensitivity, decay the latent images or generate fog.

(2) The dyes should be decolored or removed by dissolution during the photographic processings and should not leave an undesired coloration on the photographic material after processing.

(3) Where the colored layer is a filter layer or is an antihalation layer positioned on the same side of the support as the photographic emulsion layer, such a layer should be selectively colored without the other layers being substantially colored. If not, the effect of the filter layer or of the antihalation layer is deteriorated and the dye adversely spectrally influences the other layers as well.

Many attempts have been made by skilled artisans in the art to discover dyes which satisfy these requirements. For example, oxonol dyes having a pyrazolone nucleus described in British Pat. No. 506,385 (corresponding to U.S. Pat. No. 2,274,782), Japanese Patent Publication Nos. 22,069/1964 and 13,168/1968 and Japanese Patent Application No. (OPI) 85,130/1973 (corresponding to U.S. Pat. No. 3,865,817), other oxonol dyes described in U.S. Pat. Nos. 3,247,127, 3,653,905 and 2,533,472 and French Pat. No. 1,401,588 (corresponding to U.S. Pat. No. 3,379,533), 4-benzylidene pyrazolone dyes described in British Pat. No. 584,609 (corresponding to U.S. Pat. No. 3,002,837) are known.

However, it is pointed out that of these dyes, dyes which can provide satisfactory results as to characteristic (2) described above, particularly in a rapid photographic processing at a high temperature, are extremely rare.

That is, most of these known dyes are still insufficient from the standpoint of decoloring rate during development, etc., and of dissolution rate at washing of the decolored products or the colored dyes which have not been decolored.

Of the various water-soluble dyes used for dyeing the hydrophilic colloid layers of photographic light-sensitive materials, oxonol dyes having a pyrazolone nucleus represented by the dyes described in British Pat. No. 506,385 (corresponding to U.S. Pat. No. 2,274,782) are useful dyes, because these dyes are decolored in a developer solution containing a sulfite and do not adversely influence the photographic properties of the photographic emulsions. However, most of these oxonol dyes are not sufficiently mordanted by a basic polymer and diffuse from the basic polymer containing layer to other layers. Therefore, these dyes are not sufficiently satisfactory as to characteristic (3) described above.

On the other hand, where the colored layer is the filter layer, an absorption density above about 0.8 is necessary and often such a density must be obtained with a layer having a thickness of about 2 μm or less. For example, a typical case is a yellow filter layer which is positioned below a blue-sensitive layer of a multilayer color light-sensitive material. In such a case, the dye must be capable of being dissolved into the hydrophilic colloid in a high concentration.

SUMMARY OF THE INVENTION

Therefore, a first object of the present invention is to provide a photographic light-sensitive material having a hydrophilic colloid layer colored with a water-soluble dye which is easily decolored during photographic processings and which does not adversely influence the photographic properties of photographic emulsions.

A second object of the present invention is to provide a photographic light-sensitive material having hydrophilic colloid layers wherein only a basic polymer containing hydrophilic colloid layer is dyed to a sufficient extent and selectively by the dye.

A third object of the present invention is to provide a photographic light-sensitive material having a hydrophilic colloid layer containing a dye which does not result in residual color after photographic processings, particularly, in a rapid processing at a high temperature of about 30° C. or above, preferably 35° C. or above, even if a basic polymer is present in any of the hydrophilic colloid layers comprising the light-sensitive material.

A fourth object of the present invention is to provide a photographic light-sensitive material having a hydrophilic colloid layer containing a dye uniformly and in a high concentration.

These objects of the present invention have been attained with a light-sensitive material, in particular, a silver halide light-sensitive material, in which a basic polymer is present in at least one hydrophilic colloid layer and an oxonol dye represented by the general formula (I):

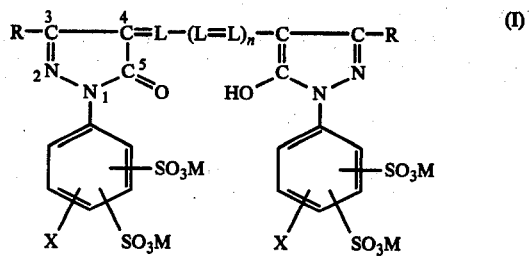

wherein R represents an aliphatic residue having at least 4 carbon atoms [for example, an alkyl group having 4 to 12 carbon atoms including straight chain or branched alkyl groups (such as an n-butyl group, an isobutyl group, a tert-butyl group, an n-pentyl group, an n-hexyl group, a cyclohexylmethyl group, a cyclohexylethyl group, a cyclohexylpropyl group, etc.), a substituted alkyl group having 4 to 8 total carbon atoms, for example, an alkyl group having a halogen atom (such as a chlorine atom, a bromine atom, etc.) as a substituent (such as a 2-chlorobutyl group, a 3-chloropentyl group, a 3-bromobutyl group, etc.), an alkyl group having an alkoxy group as a substituent (such as a 4-ethoxybutyl group, a 2-methyl-2-methoxypropyl group, etc.), an alkyl group having a sulfo group as a substituent (such as a 2-sulfobutyl group, a 3-sulfopentyl group, etc.), a cycloalkyl group having 5 to 6 carbon atoms (such as a cyclopentyl group, a cyclohexyl group, etc.), and the like], an aralkyl group preferably an aralkyl group having 7 to 10 carbon atoms (such as a benzyl group, a phenethyl group, an α-phenylethyl group, an α-phenylpropyl group, etc.) or a 5-membered or 6-membered heterocyclic group containing, as a hetero atom, one or more of an oxygen, nitrogen, sulfur or selenium atom (such as a 2-furyl group, a 2-, 3- or 4-pyridyl group, a 2-thienyl group, etc.); X represents a hydrogen atom, a halogen atom (such as a chlorine atom, a bromine atom, etc.), a sulfo group, an alkyl group having 1 to 4 carbon atoms (such as a methyl group, an ethyl group, an isopropyl group, etc.) or a hydroxy group; M represents a cation, for example, a hydrogen ion, an alkali metal ion (such as Na$^+$, K$^+$, etc.), an alkaline earth metal ion (such as Ca$^{2+}$, Ba$^{2+}$, etc.), an inorganic or organic onium ion (such as NH$_4^+$, a triethylammonium ion, a pyridinium ion, a piperidinium ion, a morpholinium ion, etc.); n represents 0, 1 or 2; and L represents a methine group, where the methine group of the methine chain represented by =L—(L=L)$_n$— can be substituted with an alkyl group having 1 to 3 carbon atoms (such as a methyl group, an ethyl group, etc.), an aryl group (such as a phenyl group, etc.), an aralkyl group (such as a benzyl group, a phenethyl group, etc.), or a halogen atom (such as a chlorine atom, etc.); is present in at least one hydrophilic colloid layer.

DETAILED DESCRIPTION OF THE INVENTION

The oxonol dye according to the present invention can be characterized as having a pyrazolone nucleus in which the 1-position of the nucleus is substituted with a phenyl group having at least two sulfo groups and in which the 3-position of the nucleus is substituted with an aliphatic residue, preferably an aliphatic residue having 4 to 12 carbon atoms, an aralkyl group, preferably an aralkyl group having 7 to 10 carbon atoms or a heterocyclic group and it is superior in mordantability and ease with which it can be decolored and dissolved during processings.

The two sulfo groups on each of the phenyl groups are positioned, for example, in the following manner.

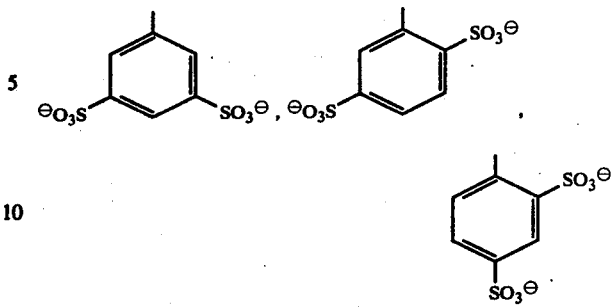

Preferred examples of oxonol dyes represented by the general formula (I) include oxonol dyes represented by the formula (Ia):

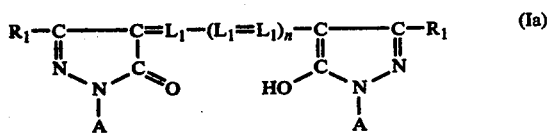

wherein A is

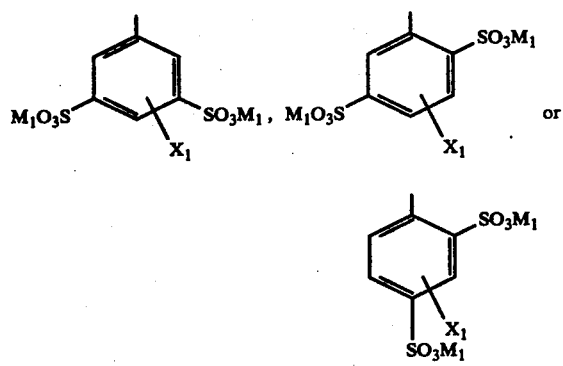

R$_1$ is an alkyl group having 4 to 6 carbon atoms, a benzyl group or a 5- or 6-membered unsaturated heterocyclic group containing a nitrogen atom or an oxygen atom as a hetero atom; X$_1$ is a hydrogen atom, a halogen atom, an alkyl group having 1 to 4 carbon atoms or a hydroxy group; L$_1$ is a methine group; M$_1$ is a hydrogen ion, an alkali metal ion or an inorganic or organic onium ion.

Specific examples of the oxonol dyes according to the present invention are illustrated below. However, the dyes of the present invention are not to be construed as being limited to these examples.

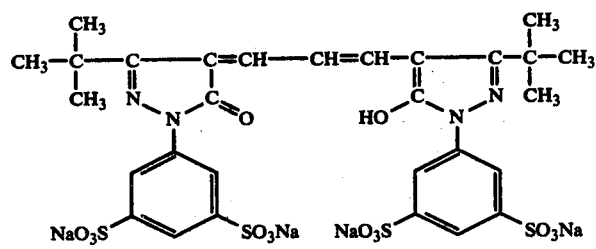

1.

-continued
2.
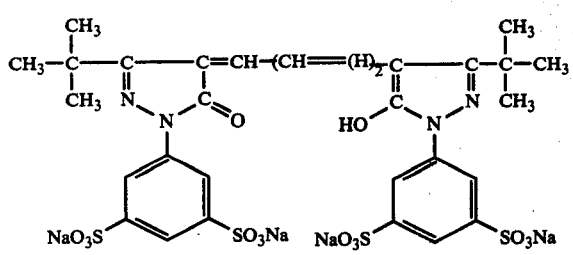
3.
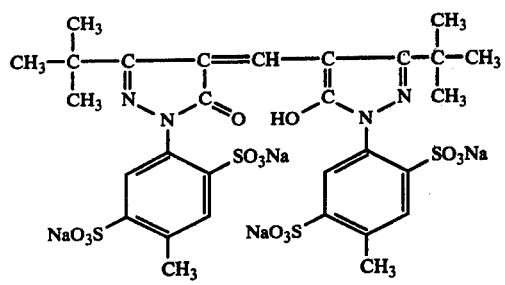
4.
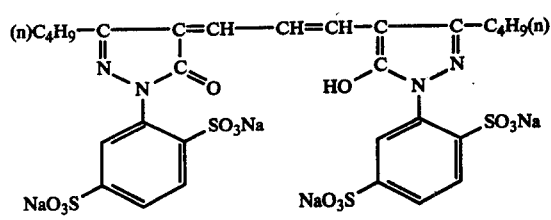
5.
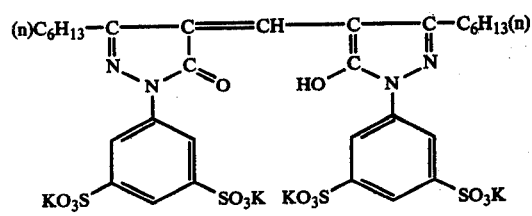
6.
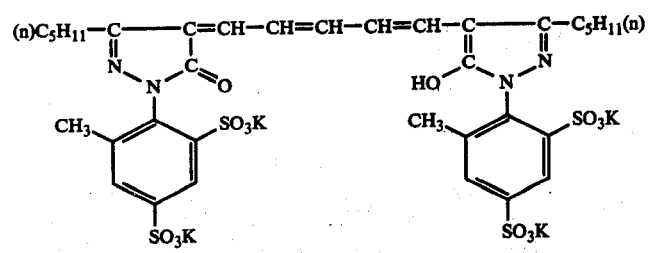
7.
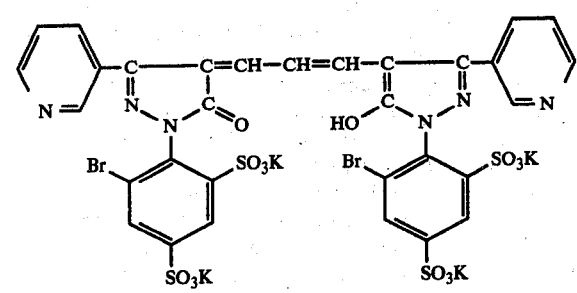

-continued

8.

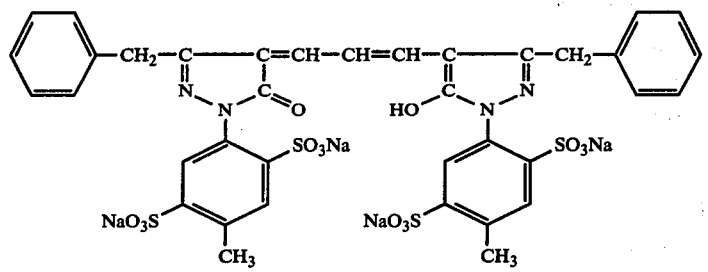

9.

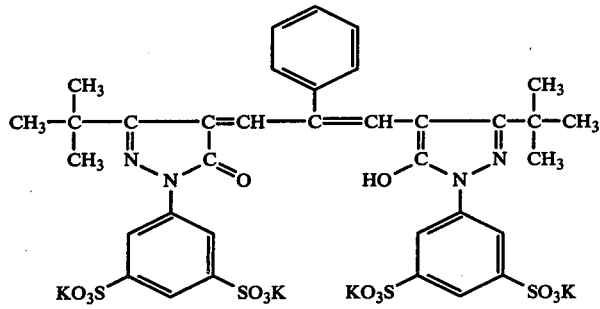

10.

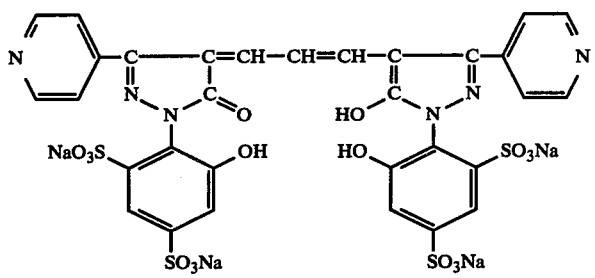

11.

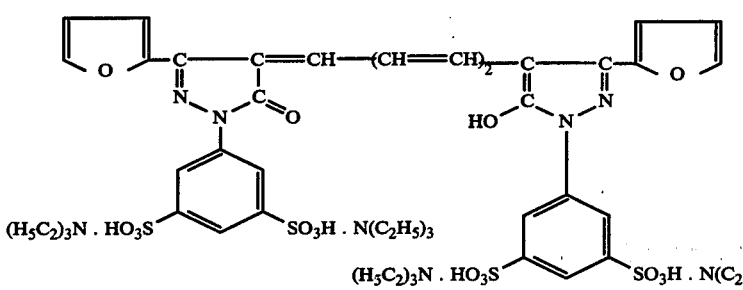

The oxonol dyes according to the present invention can be prepared by reacting a corresponding pyrazolone represented by the formula (II):

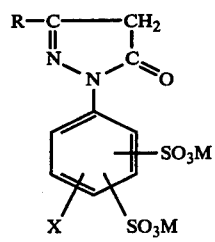

(II)

wherein R, X and M each has the same meaning as in the formula (I);
with a compound which is known to one skilled in the art for forming a methine group or a polymethine chain in the presence of an organic base such as triethylamine, pyridine, pyperidine, morpholine, etc., by the methods as disclosed in, for example, British Pat. No. 1,007,847, U.S. Pat. Nos. 3,746,539 and 3,989,528 or Japanese Patent Application (OPI) No. 62,826/73. Compounds known to form a methine group or a polymethine chain are described in British Pat. No. 1,133,986.

In greater detail, to introduce a monomethine group, ethyl orthoformate, ethyl orthoacetate or N,N-diphenylformamidine hydrochloride can be used. To introduce a trimethine chain, trimethoxypropene, tetramethoxypropane or malondialdehydedianil hydrochloride can be used. To introduce a pentamethine chain, glutacondialdehydedianil can be used.

The preparation of the dyes according to the present invention is specifically illustrated below by reference to some examples thereof. Unless otherwise indicated herein, all parts, percents, ratios and the like are by weight.

SYNTHESIS EXAMPLE 1

Synthesis of Dye 1

A mixture of 7.6 g of 3-tert-butyl-1-(3',5'-disulfophenyl)-5-pyrazolone, 2.5 g of malondialdehydedianil hydrochloride, 5 ml of triethylamine, 5 ml of acetic anhydride and 100 ml of methanol was refluxed for 2 hours with stirring. Then a solution of 4 g of anhydrous sodium acetate in 60 ml of methanol was added thereto and the mixture was refluxed for 5 minutes and cooled with water (20° C.). The crystals precipitated were collected by filtration, washed with ethanol and then with acetone sufficiently, and dried to obtain 5.3 g of dark brown crystals. An aqueous solution of this dye was red and the maximum absorption wavelength thereof was 524 nm.

SYNTHESIS EXAMPLE 2

Synthesis of Dye 2

To a mixture of 7.6 g of 3-tert-butyl-1-(3',5'-disulfophenyl)-5-pyrazolone, 2.8 g of glutacondialdehydedianil hydrochloride, 7 ml of triethylamine and 100 ml of methanol was added 8 ml of acetic anhydride at 10° to 15° C. with stirring and the mixture was further stirred for 3 hours. A solution of 4 g of anhydrous potassium acetate in 40 ml of methanol was added thereto and the mixture was stirred for 5 minutes. Then 200 ml of isopropanol was added thereto to precipitate crystals. The crystals were collected by filtration, washed with ethanol and then with acetone sufficiently and dried to obtain 5.8 g of dark blue crystals. An aqueous solution of this dye was blue and the maximum absorption wavelength thereof was 625 nm.

SYNTHESIS EXAMPLE 3

Synthesis of Dye 3

A mixture of 8.8 g of 3-tert-butyl-1-(4'-methyl-2',5'-disulfophenyl)-5-pyrazolone disodium salt, 1.9 g of N,N-diphenylformamidine hydrochloride, 5 ml of triethylamine and 150 ml of methanol was refluxed for 1 hour with stirring. The reaction mixture was concentrated to one half of its original volume under reduced pressure and then 200 ml of isopropanol was added thereto to precipitate crystals. The crystals were collected by filtration, washed with ethanol and then with acetone sufficiently and dried to obtain 5.5 g of yellow crystals. An aqueous solution of this dye was yellow and the maximum absorption wavelength thereof was 429 nm.

SYNTHESIS EXAMPLE 4

Synthesis of Dye 8

A mixture of 8.4 g of 3-benzyl-1-(4'-methyl-2',5'-disulfophenyl)-5-pyrazolone disodium salt, 2.5 g of malondialdehydedianil hydrochloride, 5 ml of triethylamine, 5 ml of acetic anhydride and 150 ml of methanol was refluxed for 3 hours with stirring. The reaction mixture was concentrated to one half of its original volume under reduced pressure and cooled with water (20° C.). The crystals precipitated were collected by filtration, washed with ethanol and then with acetone sufficiently and dried to obtain 5.8 g of brown crystals. An aqueous solution of this dye was red and the maximum absorption wavelength thereof was 525 nm.

SYNTHESIS EXAMPLE 5

Synthesis of Dye 4

A mixture of 8.1 g of 3-n-butyl-1-(2',5'-disulfophenyl)-5-pyrazolone disodium salt, 2.5 g of malondialdehydedianil hydrochloride, 8 ml of triethylamine, 5 ml of acetic anhydride and 150 ml of methanol was refluxed for 3 hours with stirring. The reaction mixture was concentrated to one half of its original volume under reduced pressure and then 200 ml of isopropanol was added thereto and cooled with water (20° C.). The crystals precipitated were collected by filtration, washed with ethanol and then with acetone sufficiently and dried to obtain 6.0 g of brown crystals. An aqueous solution of this dye was red and the maximum absorption wavelength thereof was 524 nm.

SYNTHESIS EXAMPLE 6

Synthesis of Dye 6

To a mixture of 8.0 g of 3-n-pentyl-1-(2'-methyl-4',6'-disulfophenyl)-5-pyrazolone, 2.8 g of glutacondialdehydedianil hydrochloride, 7 ml of triethylamine, 100 ml of methanol was added 8 ml of acetic anhydride at a temperature of 10° to 15° C. with stirring and the mixture was further stirred for 3 hours. A solution of 4 g of anhydrous potassium acetate in 40 ml of methanol was added thereto and the mixture was stirred for 5 minutes. Then 200 ml of isopropanol was added thereto to precipitate crystals. The crystals were collected by filtration, washed with ethanol and then with acetone sufficiently and dried to obtain 6.3 g of dark blue crystals. An aqueous solution of this dye was blue and the maximum absorption wavelength thereof was 627 nm.

The pyrazolones represented by the formula (II) which are starting materials of the dyes according to the present invention can be prepared by a method comprising condensing a $\beta$-ketoester represented by the following formula (III):

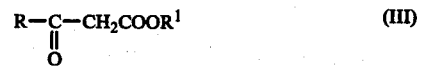

wherein R has the same meaning as in the formula (I) and $R^1$ represents an alkyl group having 1 to 6 carbon atoms or a phenyl group,
with a phenyl hydrazine having at least two sulfo groups, which is represented by the following formula (IV):

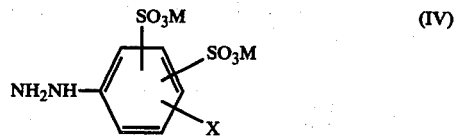

wherein M and X each has the same meaning as in the formula (I).

The $\beta$-ketoester represented by the formula (III) can be prepared by a method described in *Organic Reactions*, Vol. 1, page 267 or by a method described in *J. Am. Chem. Soc.*, Vol. 63, page 2252 (1941).

The phenylhydrazine having at least two sulfo groups and represented by the formula (IV) can be prepared by a method described in *Beilsteins Handbuch der Organischen Chemie.*, Vol. 15, page 647 or a method described in *Ber.*, Vol. 21, page 3409.

The pyrazolones represented by the formula (II) can be prepared by a method comprising reacting the β-ketoester represented by the formula (III) with the phenylhydrazine represented by the formula (IV) in a strong alkaline solution (pH: above 8 to about 9.5) at 90° C. described in Reeves, *J. Chem. Soc.*, Vol. 127, page 912, a method comprising reacting in a neutral aqueous solution at 100° C. as described in H. E. Fierz-David, L. Blangey, *Grundlegende Operationen der Farbenchemie*, 8 Aufl. (Vienna 1952), page 124, a method comprising heating in a 50% aqueous acetic acid solution as described in Möllenhoff, Ber., Vol. 25, page 1948 or a method comprising heating in a mixed solution of glacial acetic acid and triethylamine as described in Japanese Patent Application No. 48,434/1975.

The preparation of the pyrazolones represented by the formula (II) is specifically illustrated below by the reference to some examples thereof.

SYNTHESIS EXAMPLE 7

Synthesis of 3-tert-Butyl-1-(3,5-disulfophenyl)-5-pyrazolone Disodium Salt 15.2 g of hydrazinobenzene-3,5-disulfonic acid monohydrochloride was dissolved in 160 ml of a 10% sodium carbonate aqueous solution and the pH of the solution was adjusted to 6 to 7. Then the solution was heated to a temperature of 60° to 70° C. with stirring, 10.3 g of ethyl pivaloylacetate was added thereto, 40 ml of 10% sodium carbonate aqueous solution was further added thereto, then the temperature of the solution was increased to 90° C. and the solution was stirred for 3 hours. The pH of the reaction solution was maintained at 8 to 9. Then, the solution was cooled with water to 20° C. and the pH of the solution was adjusted to 3 to 4 by addition of concentrated hydrochloric acid. Then, the solution was concentrated to dryness under reduced pressure. To the residue, 8.5 ml of triethylamine and 150 ml of methanol was added and the mixture refluxed. Then, undissolved compounds were separated by filtration and filtrate was concentrated to dryness under reduced pressure. To the residue, 100 ml of methanol was added to dissolve the residue and then 6 ml of concentrated hydrochloric acid was added thereto to precipitate crystals and further 150 ml of isopropanol was added thereto so as to completely precipitate the crystals. The precipitated crystals were collected by filtration, washed with methanol and dried to obtain 27.2 g of yellowish white crystals. Further, recrystallization with 90% methanol aqueous solution was carried out to obtain yellowish white crystals having a melting point of above 300° C.

| Elemental Analysis: $C_{13}H_{14}N_2O_7S_2Na$: | C (%) | H (%) | N (%) |
|---|---|---|---|
| Calculated | 41.71 | 3.77 | 7.48 |
| Found | 41.48 | 3.83 | 7.54 |

Some specific examples of pyrazolones represented by the formula (II) are set forth below:

3-tert-Butyl-1-(3,5-disulfophenyl)-5-pyrazolone
3-tert-Butyl-1-(2,5-disulfophenyl)-5-pyrazolone disodium salt
3-n-Butyl-1-(3,5-disulfophenyl)-5-pyrazolone
3-n-Pentyl-1-(2,4-disulfophenyl)-5-pyrazolone disodium salt
3-n-Hexyl-1-(4-methyl-2,5-disulfophenyl)-5-pyrazolone disodium salt
3-Benzyl-1-(2-hydroxy-4,6-disulfophenyl)-5-pyrazolone disodium salt
3-tert-Amyl-1-(2,5-disulfophenyl)-5-pyrazolone disodium salt
3-(2-Methyl-2-ethoxypropyl)-1-(2-bromo-4,6-disulfophenyl)-5-pyrazolone disodium salt
3-(2-Pyridyl)-1-(3,5-disulfophenyl)-5-pyrazolone disodium salt
3-(4-Pyridyl)-1-(3,5-disulfophenyl)-5-pyrazolone disodium salt
3-(2-Thienyl)-1-(2-methyl-4,6-disulfophenyl)-5-pyrazolone disodium salt The dye can be incorporated into a hydrophilic colloid layer in the photographic light-sensitive material of the present invention using a conventional process. Namely, an aqueous solution of the dye having a suitable concentration is added to an aqueous solution of the hydrophilic colloid and the resulting solution is applied to a support or to another layer of the photographic light-sensitive material using known methods.

The amount of the dye to be added to the aqueous solution of the hydrophilic colloid can be decided suitably within the range of the solubility of the dye depending on the purpose. In general, an aqueous solution of the dye having a concentration of about 0.5 to 3% is employed in an amount of about 8 to about 800 mg of the dye per m$^2$ of the light-sensitive material.

It is advantageous to add the dye to a coating solution for producing a basic polymer-containing hydrophilic colloid layer in the light-sensitive material of the present invention. However, the dye can be added to a coating solution for producing other hydrophilic colloid layers, that is, photographic emulsion layers, or to a coating solution for producing other non-light-sensitive layers. In the latter case, the dye preferably is introduced into a layer as close as possible, and preferably an adjacent layer, to the basic polymer-containing layer. Even if the dye is introduced into a layer which does not contain the basic polymer, the dye diffuses into the layer which contains the basic polymer and is concentrated in that layer. Consequently, the basic polymer-containing layer is selectively dyed in the finished light-sensitive material. The dye can also be added to two or more layers.

The basic polymer-containing hydrophilic colloid layer can be present as a single layer or as two or more layers. This layer (or these layers) can be positioned above the photographic emulsion layer (i.e., farther from the support), or can be positioned between photographic emulsion layers where a plurality of photographic emulsion layers is present or between the photographic emulsion layer and the support. The layer dyed selectively due to the presence of the basic polymer can be used as a filter layer, as an antihalation layer or as a layer for other purposes depending on the position of the dyed layer.

In the light-sensitive material of the present invention, the basic polymer is present in at least one hydrophilic colloid layer. A suitable ratio by weight of the basic polymer to a total amount of polymer in the hydrophilic colloid layer (i.e., basic polymer/basic polymer plus hydrophilic colloid) is preferably 0.5 or less. Water-soluble high molecular weight materials which have basic residues in or on their main chains or branched chains and which are compatible with gelatin, which are conventionally used for mordanting acid dyes for hydrophilic colloid layers of silver halide photographic light-sensitive materials, can be used as the basic polymer. For example, it is possible to use polymers derived from ethylenically unsaturated compounds having dialkylaminoalkyl ester residues, for example, polymers having a recurring structural unit represented by the formula:

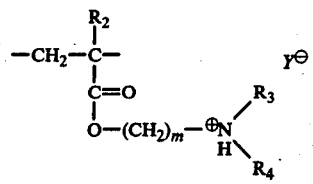

wherein $R_2$, $R_3$, $R_4$, m and Y each has the same meaning as hereinfter defined, as disclosed in U.S. Pat. No. 2,675,316, and copolymers having the above-described tertiary amine recurring structural unit and a quaternary ammonium recurring unit corresponding to the tertiary amine unit as disclosed in U.S. Pat. No. 2,839,401;

maleic acid anhydride copolymers or derivatives thereof represented by the formula:

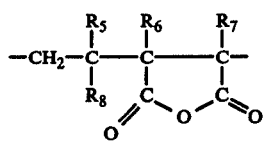

wherein $R_5$, $R_6$ and $R_7$ each represents a hydrogen atom or a lower alkyl group; $R_8$ represents a hydrogen atom, an alkyl group, a monocyclic aryl group or a carbalkoxyl group; polymers represented by the formula:

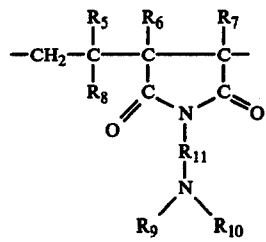

wherein $R_5$, $R_6$, $R_7$ and $R_8$ each have the meanings described above; $R_9$ and $R_{10}$ each represents a lower alkyl group or $R_9$ and $R_{10}$ together represent the atoms necessary to complete a piperidine or morpholine ring; and $R_{11}$ represents an alkylene group, as disclosed in U.S. Pat. No. 3,016,306; polymers prepared by reacting polyvinyl alkylketones with aminoguanidine, for example, polymers having a recurring structural unit represented by the formula:

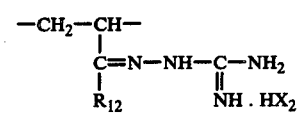

wherein $R_{12}$ represents an alkyl group; and $X_2$ represents an acid radical, as disclosed in U.S. Pat. No. 2,882,156; polymers having a 2-methylimidazole nucleus in the side chain thereof as described in U.S. Pat. No. 3,445,231;

addition polymers of bisacrylamide and a secondary diamine or the quaternary salt thereof as disclosed in U.S. Pat. No. 3,795,519;

vinylpyridine or vinylquinoline polymers as disclosed in U.S. Pat. Nos. 2,798,063 and 2,721,852;

addition polymers having a recurring structural unit represented by the formula:

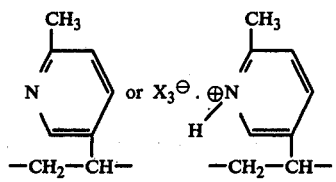

and a recurring structural unit represented by the formula:

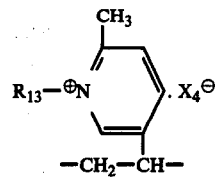

wherein $X_3^\ominus$ and $X_4^\ominus$ each represents an anion and $R_{13}$ represents an aliphatic group or a cycloaliphatic group, as disclosed in U.S. Pat. No. 3,624,229; and polymers having a recurring structural unit represented by the formula:

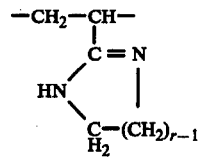

wherein r is 2 or 3, as disclosed in German Patent Application (OLS) No. 1,914,362 (corresponding to British Pat. No. 1,221,131).

The ratio of the oxonol dye to the basic polymer can be varied without serious limitation. It is preferred for the basic polymer to be present in an amount such that about 4 to 20 basic functional groups in the basic polymer are present per mol of the oxonol dye.

Of these basic polymers, polymers derived from ethylenically unsaturated compounds having dialkylaminoalkyl ester residues, for example, the polymers represented by the following general formula:

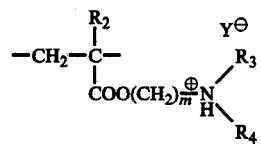

wherein $R_2$ represents a hydrogen atom or a methyl group; $R_3$ and $R_4$, which may be the same or different, each represents an alkyl group, preferably an alkyl group having 4 or less carbon atoms (such as an ethyl group, etc.); m represents an integer of 1 to 4 (such as 2, etc.); and $Y^\ominus$ represents an anion, for example, a halogen ion (such as a chlorine ion, etc.), a hydroxide ion and the like, such as polydiethyl(or methyl)aminoethylmethacrylate;

polymers prepared by reacting polyvinyl alkylketones with aminoguanidine, for example, the polymers represented by the following general formula:

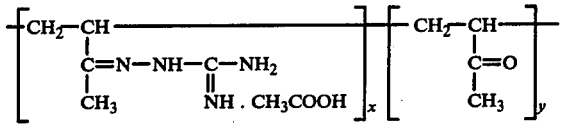

where x:y molar ratio ranges from about 30:70 to about 70:30 are preferred.

Furthermore, basic polymers having the following recurring unit specifically illustrated below can also be used.

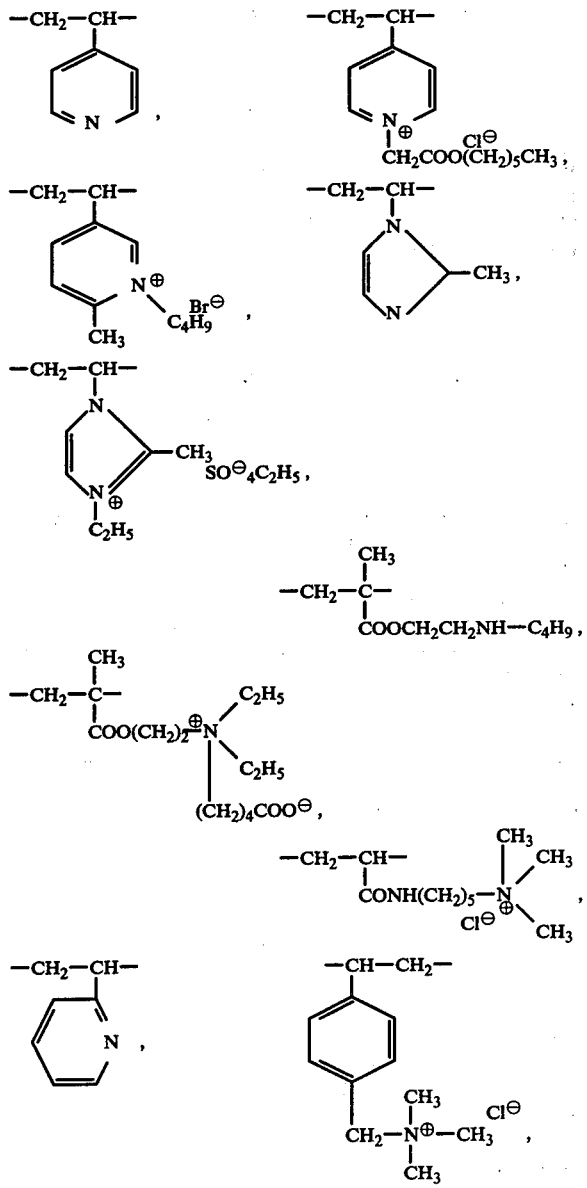

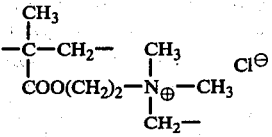

The molecular weight of the basic polymer is not critical to its mordanting property, but a range of about 10,000 to about 300,000 is preferred. An appropriate molecular weight can be selected depending on the structures of the dye and the basic polymer used.

As the hydrophilic colloid, for example, gelatin, casein, polyvinylalcohol, poly-N-vinylpyrrolidone, carboxymethyl cellulose, sodium alginate, and the like can be used. Of these colloids, gelatin is preferred. Other photographic additives, for example, a coating aid, a hardening agent, etc., can be added to a solution containing the dye prior to coating.

Supports of the photographic light-sensitive materials, coating methods, photographic additives, methods for preparing photographic emulsions, and photographic processing methods which can be used are those described, for example, in Japanese Patent Application No. 51,928/1974 (corresponding to Japanese Patent Application (OPI) No. 145,125/1975 and U.S. patent application Ser. No. 575,891, filed May 8, 1975), page 27, line 1 to page 66, line 12, Research Disclosures, No. 92, pages 107 to 110 (December, 1971), U.S. Pat. Nos. 3,996,055, column 32, line 23 to column 37, line 25, 3,994,729, column 2, line 15 to column 5, line 61 and 3,997,348, column 6, line 51 to column 31, line 9.

According to the present invention, where a dyed hydrophilic colloid layer is provided on the light-sensitive material as a filter layer or an antihalation layer or for other purposes, a sufficient absorption density is possible, even though the thickness of such a layer is reduced so as to achieve good resolving power. This is because the dye used in the present invention has high water solubility and good compatibility with gelatin. Further, in the light-sensitive material of the present invention, no residual color remains on the light-sensitive material after processing, because the dyed layer is easily and irreversibly decolored during photographic processing.

Incorporation of the dye into the hydrophilic colloid layer in the light-sensitive materials of the present invention does not adversely influence the photographic properties of the photographic emulsion layers. Namely, the sensitivity or gradation of the photographic emulsion layers is not deteriorated or softened except for that due to the filter effect of the dyed layer itself (where the dyed layer is nearer incident light of exposure than the emulsion layers), and, further, the emulsion layers are not fogged. This is true for both the photographic properties in the inherent light-sensitive wavelength range of silver halide and those in the color sensitized range. Further, no degradation appears with the lapse of time after the preparation of the light-sensitive materials.

In the light-sensitive materials of the present invention, the dye is fixed in only the basic polymer containing layer and does not diffuse into other layers. Accordingly, unexpected deterioration of the sensitivity or gradation of the photographic emulsion layers which is caused by an undesired spectral absorption effect due to diffusion of the dye does not occur and, consequently, the light-sensitive materials have good photographic properties and particularly excellent spectral characteristics. Particularly, this is very advantageous in black-and-white or color photographic light-sensitive materials where an antihalation layer is positioned between a photographic emulsion layer and the support and color photographic light-sensitive materials which comprise at least three photographic emulsion layers and a filter layer between the emulsion layers where the filter layer may have the function of an antihalation layer. Namely, when the dye diffuses from the layer to be dyed into an emulsion layer which lies above it (i.e., farther from the support) or into a hydrophilic colloid layer which lies even farther from the support, the emulsion layer is affected by the filter effect of such a dye and the sensitivity is deteriorated and gradation is softened with respect to light of wavelength range which is absorbed by the dye.

In the light-sensitive materials of the present invention, since such diffusion of the dye does not happen, the deterioration of sensitivity of the emulsion layers which are above the dyed layer (farther from the support) can be substantially disregarded. Namely, such does not exceed about 0.06 in logarithmic exposure amount.

The present invention is illustrated in greater detail by reference to the following examples. In the examples, percents, ratios and parts are by weight, unless otherwise indicated.

EXAMPLE 1

80 g of gelatin was dissolved in 1 liter of water and 80 ml of a 5% aqueous solution of poly(diethylaminoethylmethacrylate) (molecular weight: about 70,000), 30 ml of a 10% aqueous solution of saponin, 50 ml of a 2% aqueous solution of potassium alum and 400 ml of a 2% aqueous solution of the dye according to the present invention or a comparison dye were added thereto to prepare a dye-gelatin solution. The dye-gelatin solution was coated on a cellulose acetate photographic support at a dry thickness of 4 microns and it was dried so as to complete the drying in about 20 minutes.

The sample was cut into a piece of 6 cm$^2$ and the piece was immersed with agitation in 1 liter of an aqueous solution containing 50 ml of a 1% aqueous solution of sodium dodecylbenzenesulfonate which is conventionally used as a surface active agent for a coating solution at 38° C. After 10 minutes and 60 minutes, the spectral absorption density of the sample was measured, and the mordanting ratio of the dye was determined.

The mordanting ratio was defined as follows.

$$\text{Mordanting Ratio} = \left(\frac{1 - a_{10}}{a_{60}}\right) \times 100$$

wherein $a_{10}$ and $a_{60}$ represents the spectral absorption densities at the same wavelength (absorption maximum wavelength of the dye) of the sample measured after 10 minutes and 60 minutes, respectively.

Further, the sample was immersed with agitation for 3 minutes in an aqueous solution at 38° C. which contained 50 g of sodium sulfite per liter thereof and whose pH was adjusted to 10.0 with sodium carbonate. The spectral absorption of the sample was measured before and after the immersion. Also, a sample which did not contain any dye was prepared in the same manner as described above and the spectral absorption density of the sample was measured. The remaining color ratio was determined using the following relationship.

$$\text{Remaining Color Ratio} = \frac{a_1 - a_0}{a_2 - a_0}$$

wherein $a_1$, $a_2$ and $a_0$ represents the spectral absorption densities at the absorption maximum wavelength of the dye of a sample containing a dye after immersion, of the sample before immersion and of a sample which did not contain a dye, respectively.

For comparison, compounds having the following formulae were used.

Comparison Dye A

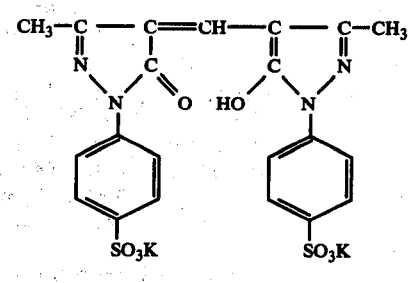

Comparison Dye B

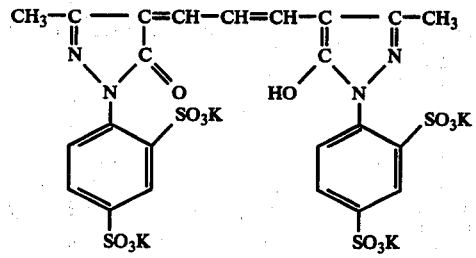

Comparison Dye C

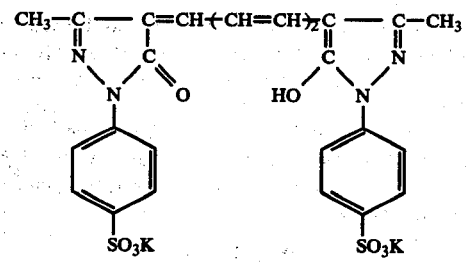

Comparison Dye D

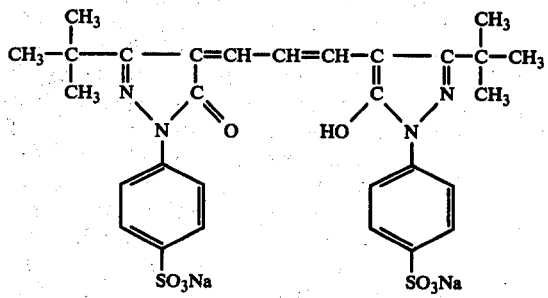

Comparison Dye E

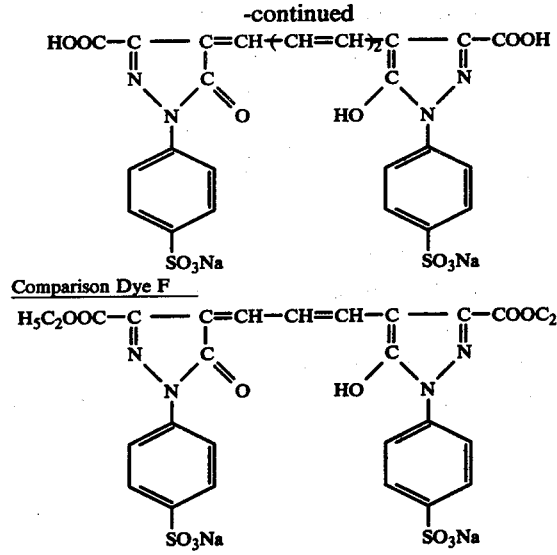

Comparison Dyes A, B and C above are included within the formula described in Japanese Patent Publication No. 13,168/1968. Comparison Dye E is included within the formulae described in Japanese Patent Publication No. 3,504/1968 and U.S. Pat. 3,647,460 and Comparison Dye F is included within the formula described in Japanese Patent Application (OPI) 85,130/1973.

The results obtained are shown in the following table.

| Dye Used | Mordanting Ratio | Remaining color Ratio |
|---|---|---|
| 1 | 95 | 0 |
| 3 | 98 | 0 |
| 4 | 96 | 5 |
| 5 | 95 | 0 |
| 7 | 98 | 5 |
| 9 | 96 | 0 |
| A (comparison) | 80 | 0 |
| B (comparison) | 83 | 0 |
| C (comparison) | 65 | 0 |
| D (comparison) | 93 | 65 |
| E (comparison) | 75 | 0 |
| F (comparison) | 72 | 0 |

It can be seen that Dyes 1, 3, 4, 5, 7 and 9 which are included within the scope of the present invention have superior properties with respect to the mordanting ratio and the remaining color ratio in comparison with Comparison Dyes A, B, C, E and F. Comparison Dye D exhibits a good mordanting ratio but a very high remaining color ratio and thus is inferior to the dyes of the present invention.

EXAMPLE 2

To a subbed cellulose acetate film, a silver iodobromide (iodide content: 6 mol%) emulsion containing a cyan forming coupler (molar ratio of Ag/coupler: 8) which was spectrally sensitized to red light was applied (2 g Ag/m$^2$) in a thickness of 5 μm. Then a gelatin intermediate layer having a thickness of 1.5 μm was produced on the resulting layer and a silver iodobromide (iodide content: 6 mol%) emulsion containing a magenta forming coupler (molar ratio of Ag/coupler: 10) which was spectrally sensitized to green light was applied (2 g Ag/m$^2$) thereto in a thickness of 4 μm. The film was cut into four equal portions. To these films, four coating solutions, each having the composition described below were applied, respectively, to form a yellow filter layer having a thickness of 2 μm (the absorption density of the yellow filter layers at the maximum absorption wavelength was 0.9). Further, a blue-sensitive silver iodobromide (iodide content: 6 mol%) emulsion containing a yellow forming coupler (molar ratio of Ag/coupler: 6) was applied (2 g Ag/m$^2$) in a thickness of 5 μm and then gelatin was applied to form a surface protective layer having a thickness of 1 μm.

Cyan Coupler

2-[α-(2,4-Di-tert-amylphenoxy)butyramido]-4,6-dichloro-5-methylphenol

Magenta Coupler 1-(2',4',6'-Trichlorophenyl)-3-[3''-(2''',4'''-di-tert-amylphenoxyacetamido)benzamido]-5-pyrazolone

Yellow Coupler

α-(2-Methylbenzoyl)aceto-(2'-chloro-5'-dodecyloxycarbonyl)anilide

The samples thus prepared each corresponded to a color negative light-sensitive material. These samples were designated 2A to 2D, respectively, according to the kind of yellow filter layer used.

Coating Solution for Yellow Filter Layer

2A

| | | |
|---|---|---|
| Aqueous Gelatin Solution | 10% aq. soln. | 500 cc |
| Poly(2-diethylaminoethyl-methacrylate) | 5% aq. soln. | 220 cc |
| Comparison Dye A in Example 1 | 10% aq. soln. | 80 cc |
| 2,4-Dichloro-6-hydroxy-1,3,5-triazine Sodium Salt | 1% aq. soln. | 25 cc |
| Dodecaethyleneglycol-4-nonylphenol Ether | 2% aq. soln. | 30 cc |

2B

Dye 3 according to the present invention was used in 2A instead of Dye A. The amount of the solution (10% aq. soln.) added was 80 cc.

2C

Dye 5 according to the present invention was used in 2A instead of Dye A. The amount of the solution (10% aq. soln.) added was 80 cc.

2D

| | | |
|---|---|---|
| Aqueous Gelatin Solution (containing 8 g of Carey-Lea type yellow colloidal silver) | 6% aq. soln. | 500 g |
| 2,4-Dichloro-6-hydroxy-1,3,5-triazine Sodium Salt | 1% aq. soln. | 25 cc |
| Polyethyleneglycol-4-nonylphenol Ether | 2% aq. soln. | 30 cc |

Each sample was exposed to light for 1/200 second through a Fuji Color Separation Filter Sp-1 (maximum transmittance (Tmax) = about 38%, wavelength at Tmax = about 433 mμ, wavelength at Tmax/2 = about 498 mμ) and a continuous gray wedge using a tungsten light source of a color temperature of 5500° K. and then the sample was subjected to the following processings.

| Step | | Temperature (°C) | Time (min) |
|---|---|---|---|
| 1. | Color Development | 37.8 | 3.5 |
| 2. | Water Washing | " | 1 |
| 3. | Bleaching | " | 4.5 |
| 4. | Water Washing | " | 1 |
| 5. | Fixing | " | 6 |
| 6. | Water Washing | " | 1 |
| 7. | Stabilizing | " | 1 |

Each processing solution used had the following composition.

| Color Developer Solution | |
|---|---|
| Sodium Hydroxide | 2 g |
| Sodium Sulfite | 2 g |
| Potassium Bromide | 0.4 g |
| Sodium Chloride | 1 g |
| Borax | 4 g |
| Hydroxylamine Sulfate | 2 g |
| Tetrasodium Ethylenediamine Tetraacetate | 2 g |
| 4-Amino-3-methyl-N-ethyl-N-(β-hydroxyethyl)aniline Sesquisulfate (monohydrate) | 4 g |
| Water to make | 1 l |
| Bleaching Solution | |
| Sodium Salt of Ethylenediamine Tetraacetic Acid-Ferric Complex Salt | 100 g |
| Potassium Bromide | 50 g |
| Ammonium Nitrate | 50 g |
| Boric Acid | 5 g |
| Water to make | 1 l |
| Fixing Solution | |
| Sodium Thiosulfate | 150 g |
| Sodium Sulfite | 15 g |
| Borax | 12 g |
| Glacial Acetic Acid | 15 ml |
| Potassium Alum | 20 g |
| Water to make | 1 l |
| Stabilizing Solution | |
| Boric Acid | 5 g |
| Sodium Citrate | 5 g |
| Sodium Metaborate (tetrahydrate) | 3 g |
| Potassium Alum | 15 g |
| Water to make | 1 l |

A photographic characteristic curve of the yellow image on each processed sample was produced and the exposure amount necessary to obtain a density of fog + 0.1 was determined. The sensitivity was evaluated as the reciprocal of the exposure amount. The resulting relative value of sensitivity and the degree of stain on each sample were as follows.

| Sample No. | Relative Sensitivity of Yellow Image by Blue Light Exposure | Stain |
|---|---|---|
| 2A | 76 | None |
| 2B | 92 | None |
| 2C | 94 | None |
| 2D | 100 | Present |

In Sample 2A wherein Comparison Dye A was used, the sensitivity of the blue-sensitive emulsion layer was fairly well reduced as compared with that of the control Sample 2D due to a filter effect arising from the diffusion of the dye into the blue-sensitive emulsion layer from the yellow filter layer. Samples 2B and 2C according to the present invention had nearly the same sensitivity as that of the control Sample 2D using colloidal silver in the yellow filter layer, and stains were not observed in these films as in Sample 2D.

EXAMPLE 3

To a subbed cellulose acetate film, a silver iodobromide emulsion containing a cyan forming coupler which was spectrally sensitized to red light (the same as used in Example 2) was applied in a thickness of 5 μm. This film was divided into five equal portions. Then, as a gelatin intermediate layer, coating solutions having the following compositions 3A to 3E were each applied to form a magenta filter layer having a 1.5 μm thickness. (The absorption density at the maximum absorption wavelength of the magenta filter layer was 0.4.)

3A

The same as 2A described above, except for using 40 cc of a 10% aqueous solution of Dye 1 according to the present invention instead of Comparison Dye A.

3B

Dye 4 according to the present invention was used in 3A instead of Dye 1. The amount of the solution (10% aqueous solution) added was 40 cc.

3C

Comparison Dye B (as described in Example 1) was used in 3A instead of Dye 1. The amount of the solution (10% aqueous solution) added was 40 cc.

3D

Comparison Dye F described above was used in 3A instead of Dye 1. The amount of the solution (10% aqueous solution) added was 40 cc.

3E

| | | |
|---|---|---|
| Aqueous Gelatin Solution | 8% aq. soln. | 500 cc |
| 2,4-Dichloro-6-hydroxy-1,3,5-triazine Sodium Salt | 1% aq. soln. | 25 cc |
| Dodecaethyleneglycol-4-nonylphenol Ether | 2% aq. soln. | 30 cc |

To the formed layer, a silver iodobromide emulsion containing a magenta forming coupler which was spectrally sensitized to green light (the same as used in Example 2) was applied in a thickness of 4 μm. Then, the yellow filter layer described in 2D described above was provided in a thickness of 2 μm. Further, a blue-sensitive silver iodobromide emulsion containing a yellow forming coupler (the same as used in Example 2) was applied thereto in a thickness of 5 μm and finally a surface protective layer of gelatin was formed in a thickness of 1 μm. The finished samples each corresponded to a color negative light-sensitive material. These samples were designated Samples 3A to 3E, respectively, according to the kind of magenta filter layer employed.

Each sample was exposed to light for 1/200 second through a Fuji Color Separation Filter Sp-2 (maximum transmittance (Tmax) = 63%, wavelength at Tmax = 535 mμ, wavelength at Tmax/2 = 510 mμ) and a continuous gray wedge using a tungsten light source having a color temperature of 5500° K. and then the sample was subjected to the same processings as in Example 2.

A photographic characteristic curve of the magenta image of each processed sample was obtained and the sensitivity value was determined in the same manner as in Example 2. The resulting relative value of sensitivity and the degree of stain on each sample were as follows.

| Sample No. | Relative Sensitivity of Magenta Image by Green Light Exposure | Stain |
|---|---|---|
| 3A | 91 | None |
| 3B | 95 | None |
| 3C | 73 | None |
| 3D | 68 | None |
| 3E | 100 | None |

In Samples 3C and 3D wherein Comparison Dyes C and D were used, the sensitivity of the green-sensitive emulsion layer was fairly well reduced as compared with that of the control Sample 3E due to a filter effect arising from a diffusion of the dye into the green-sensitive emulsion layer from the magenta filter layer. However, in Samples 3A and 3B according to the present invention, diffusion of the dye into the green-sensitive emulsion layer was so slight that it could be disregarded and the sensitivity was nearly the same as that in control Sample 3E.

EXAMPLE 4

To a subbed cellulose acetate film, four coating solutions having the following compositions were applied, respectively, to form an antihalation layer having a thickness of 1 μm. To this layer, a silver iodobromide emulsion containing a cyan forming coupler which was spectrally sensitized to red light (the same as used in Example 2) was applied in a thickness of 5 μm and then a gelatin intermediate layer was formed in a thickness of 1.5 μm. Further, a silver iodobromide emulsion containing a magenta forming coupler which was spectrally sensitized to green light (the same as used in Example 2) was applied thereto in a thickness of 4 μm. To this layer a yellow filter layer described in 2D described above was applied in a thickness of 2 μm. Further, a bluesensitive silver iodobromide emulsion (the same as used in Example 2) containing a yellow forming coupler was applied thereto in a thickness of 5 μm and finally a surface protective layer of gelatin was formed thereon in a thickness of 1 μm. The finished sample corresponded to a color negative light-sensitive material. The samples were designated Film 4A to 4D, respectively, according to the kind of antihalation layer employed.

Coating Solution for Antihalation Layer

4A

The same as 2A described above except for using 32 cc of a 10% aqueous solution of Comparison Dye E described above instead of Comparison Dye A.

4B

The same as 4A but using Dye 2.

4C

The same as 4A but using Dye 6.

4D

The same as 3E.

Each sample was exposed to light for 1/200 second through a a Fuji Color Separation Filter Sp-3 (maximum transmittance (Tmax) = about 92%, wavelength at Tmax/2 = about 600 mμ) and a continuous gray wedge using a tungsten light source with a color temperature of 5500° K. and then the sample was subjected to the same processing as in Example 2.

A photographic characteristic curve of the cyan image on each processed sample was obtained and the sensitivity value was determined in the same manner as in Example 2. The resulting relative value of sensitivity and the degree of stain on each sample were as follows.

| Sample No. | Relative Sensitivity of Cyan Image by Red Light Exposure | Stain |
|---|---|---|
| 4A | 73 | None |
| 4B | 90 | None |
| 4C | 95 | None |
| 4D | 100 | None |

In Sample 4A wherein Comparison Dye E was used, the sensitivity of the red-sensitive emulsion layer was fairly well reduced as compared with that of the control Sample 4D due to a filter effect arising from diffusion of the dye into the red-sensitive emulsion layer from the antihalation layer. Samples 4B and 4C according to the present invention had nearly the same sensitivity as that of the control Sample 4D.

While the invention has been described in detail and with reference to specific embodiments thereof, it will be apparent to one skilled in the art that various changes and modifications can be made therein without departing from the spirit and scope thereof.

What is claimed is:

1. A siver halide light-sensitive material comprising a support having thereon a silver halide light-sensitive emulsion layer and at least one hydrophilic colloid layer containing a basic polymer and at least one oxonol dye represented by the following general formula (I):

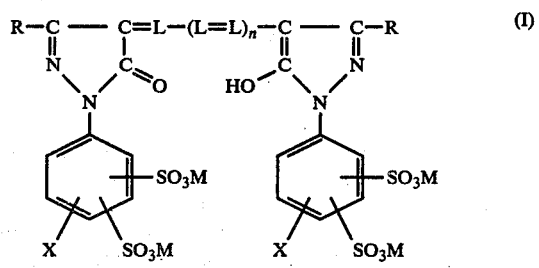

wherein R represents an aliphatic residue having 4 or more carbon atoms, an aryalkyl group or a member selected from the class consisting of a 2-furyl group, a 2-, 3- or 4-pyridyl group or a 2-thienyl group; X represents a hydrogen atom, a halogen atom, a sulfo group, an alkyl group having 1 to 4 carbon atoms, or a hydroxy group; L represents a methine group; M represents a cation; and n represents 0, 1 or 2.

2. The silver halide light-sensitive material as claimed in claim 1, wherein the aliphatic residue for R is an alkyl group having 4 to 12 carbon atoms; an alkyl group having 4 to 8 carbon atoms and substituted with one or more of a halogen atom, an alkoxy group or a sulfo group; or a cycloalkyl group having 5 to 6 carbon atoms.

3. The silver halide light-sensitive material as claimed in claim 1, wherein the aralkyl group for R is an aralkyl group having 7 to 10 carbon atoms.

4. The silver halide light-sensitive material as claimed in claim 1, wherein M is a hydrogen ion, an alkali metal ion, an alkaline earth metal ion, an inorganic onium ion or an organic onium ion.

5. The silver halide light-sensitive material as claimed in claim 1, wherein the methine chain represented by =L—(L=L)$_n$— is substituted with an alkyl group having 1 to 3 carbon atoms, an aryl group, an aralkyl group or a halogen atom.

6. The silver halide light-sensitive material as claimed in claim 1, wherein the dye is present in an amount of about 8 to about 800 mg per m² thereof.

7. The silver halide light-sensitive material as claimed in claim 1, wherein the basic polymer is a water-soluble high molecular weight material having a basic residue in or on the main chain or a branched chain thereof, being compatible with gelatin and being used for mordanting the oxonol dye.

8. The silver halide light-sensitive material as claimed in claim 7, wherein the basic polymer is represented by the following formula:

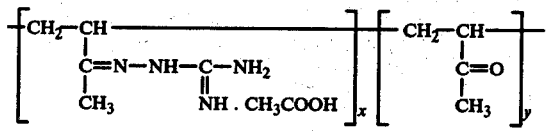

wherein R$_2$ represents a hydrogen atom or a methyl group; R$_3$ and R$_4$, which may be the same of different, each represents an alkyl group; m represents an integer of 1 to 4; and Y$^\ominus$ represents an anion.

9. The silver halide light-sensitive material as claimed in claim 7, wherein the basic polymer is represented by the following formula:

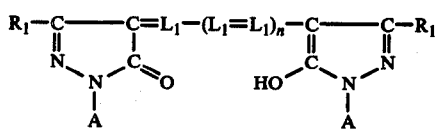

wherein x and y each represents molar proportions and the molar ratio of x:y ranges from about 30:70 to about 70:30.

10. The silver halide light-sensitive material as claimed in claim 7, wherein the basic polymer has a molecular weight of about 10,000 to about 300,000.

11. The silver halide light-sensitive material as claimed in claim 1, wherein the oxonol dye is represented by the formula (Ia):

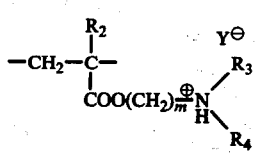 (Ia)

wherein A is

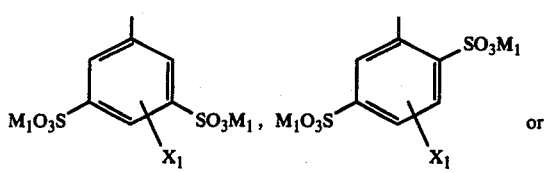 or

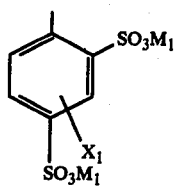

R$_1$ is an alkyl group having 4 to 6 carbon atoms, a benzyl group, or a member selected from the class consisting of a 2-furyl group, a 2-, 3- or 4-pyridyl group or a 2-thienyl group; X$_1$ is a hydrogen atom, a halogen atom, an alkyl group having 1 to 4 carbon atoms or a hydroxy group; L$_1$ is a methine group; M$_1$ is a hydrogen ion, an alkali metal ion or an inorganic or orgaic onium ion.

12. The silver halide light-sensitive material as claimed in claim 1, wherein the oxonol dye is:

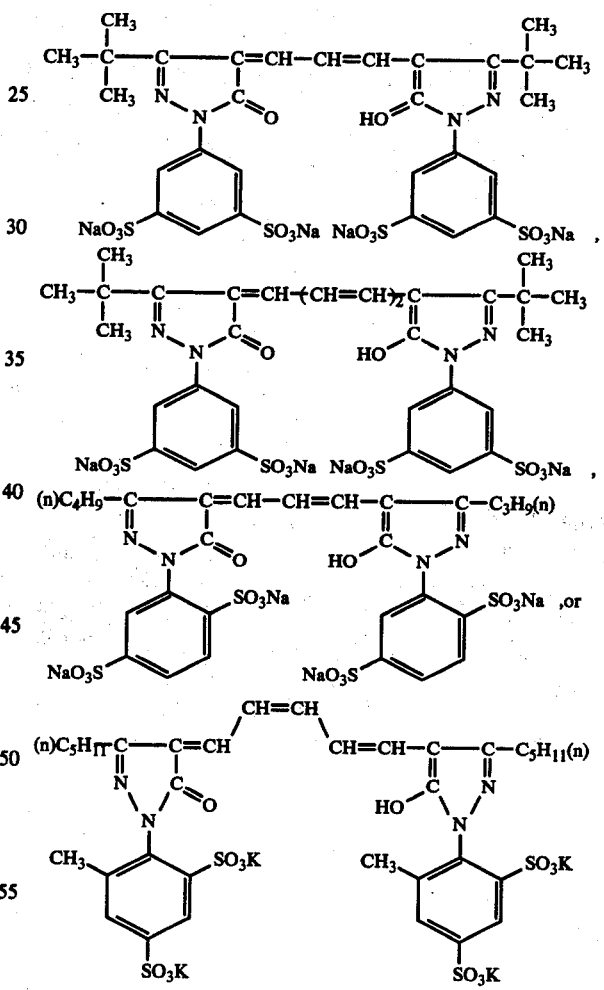

13. The silver halide light-sensitive material as claimed in claim 1, wherein the hydrophilic colloid layer dyed with the oxonol dye is a non-light-sensitive layer.

14. The silver halide light-sensitive material as claimed in claim 1, wherein the basic polymer is a polymer having a recurring structural unit represented by the formula:

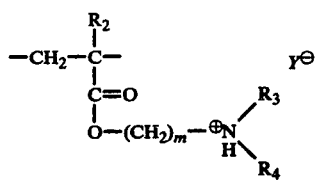

wherein $R_2$ represents a hydrogen atom or a methyl group; $R_3$ and $R_4$, which may be the same or different, each represents an alkyl group; m represents an integer of 1 to 4; and $Y^\ominus$ represents an anion;

a polymer represented by the formula:

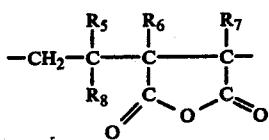

wherein $R_5$, $R_6$ and $R_7$ each represents a hydrogen atom or a lower alkyl group; $R_8$ represents a hydrogen atom, an alkyl group, a monocyclic aryl group or a carbalkoxyl group;

a polymer represented by the formula:

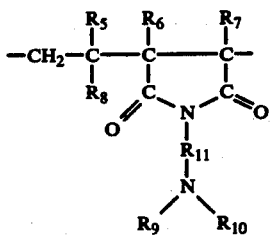

wherein $R_5$, $R_6$, $R_7$ and $R_8$ each have the meanings described above; $R_9$ and $R_{10}$ each represents a lower alkyl group or $R_9$ and $R_{10}$ together represent the atoms necessary to complete a piperidine ring or a morpholine ring; and $R_{11}$ represents an alkylene group;

a polymer having a recurring structural unit represented by the formula:

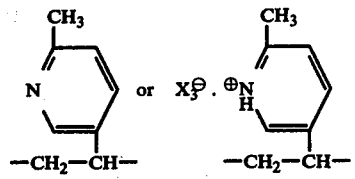

wherein $R_{12}$ represents an alkyl group; and $X_2$ represents an acid radical;

a polymer having a 2-methylimidazole nucleus in the side chain thereof;

an addition polymer of bisacrylamide and a secondary diamine or the quaternary salt thereof;

a vinylpyridine or vinylquinoline polymer;

an addition polymer having a recurring structural unit represented by the formula:

and a recurring structural unit represented by the formula:

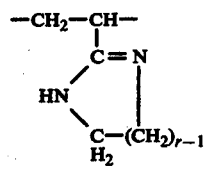

wherein $X_3^\ominus$ and $X_4^\ominus$ each represents an anion and $R_{13}$ represents an aliphatic group or a cycloaliphatic group; or a polymer having a recurring structural unit represented by the formula:

wherein r is 2 or 3.

* * * * *